United States Patent
Nosker et al.

(10) Patent No.: US 11,098,175 B2
(45) Date of Patent: *Aug. 24, 2021

(54) IN SITU EXFOLIATION METHOD TO FABRICATE A GRAPHENE-REINFORCED POLYMER MATRIX COMPOSITE

(71) Applicant: Rutgers, The State University of New Jersey, New Brunswick, NJ (US)

(72) Inventors: Thomas Nosker, Stockton, NJ (US); Jennifer Lynch, Franklin Park, NJ (US); Justin Hendrix, Washington, DC (US); Bernard Kear, Whitehouse Station, NJ (US); Gordon Chiu, Summit, NJ (US); Stephen Tse, Warren, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 117 days.

This patent is subject to a terminal disclaimer.

(21) Appl. No.: 15/900,137

(22) Filed: Feb. 20, 2018

(65) Prior Publication Data

US 2019/0062521 A1    Feb. 28, 2019

Related U.S. Application Data

(63) Continuation of application No. 14/437,040, filed as application No. PCT/US2013/031495 on Mar. 14, 2013, now Pat. No. 9,896,565.

(60) Provisional application No. 61/716,461, filed on Oct. 19, 2012.

(51) Int. Cl.
| | |
|---|---|
| *C08K 3/04* | (2006.01) |
| *B29C 48/56* | (2019.01) |
| *B29C 48/67* | (2019.01) |
| *C08J 3/20* | (2006.01) |
| *C08J 5/00* | (2006.01) |
| *B29K 105/16* | (2006.01) |

(52) U.S. Cl.
CPC .............. *C08K 3/04* (2013.01); *B29C 48/56* (2019.02); *B29C 48/67* (2019.02); *C08J 3/201* (2013.01); *C08J 5/005* (2013.01); *B29K 2105/162* (2013.01); *C08J 2300/22* (2013.01); *C08J 2381/06* (2013.01); *C08K 2201/011* (2013.01)

(58) Field of Classification Search
CPC ........ C08J 2300/22; C08J 3/201; C08J 5/005; C08K 2201/011; C08K 3/04
See application file for complete search history.

(56) References Cited

U.S. PATENT DOCUMENTS

| | | | |
|---|---|---|---|
| 6,042,765 A | 3/2000 | Sugahara et al. | |
| 6,962,431 B1 | 11/2005 | Luker | |
| 7,745,528 B2 | 6/2010 | Prud'Homme et al. | |
| 8,167,190 B1 | 5/2012 | Bullock et al. | |
| 8,303,876 B1 | 11/2012 | Torkelson et al. | |
| 8,734,696 B1 | 5/2014 | Torkelson et al. | |
| 9,139,440 B2 | 9/2015 | Felisari et al. | |
| 9,896,565 B2 | 2/2018 | Nosker et al. | |
| 2005/0186378 A1 | 8/2005 | Bhatt | |
| 2006/0047052 A1 | 3/2006 | Barrera et al. | |
| 2006/0062986 A1 | 3/2006 | Magario et al. | |
| 2008/0279756 A1* | 11/2008 | Zhamu ................ | C01B 32/225 423/448 |
| 2009/0087661 A1 | 4/2009 | Eder | |
| 2010/0147188 A1 | 6/2010 | Mamak et al. | |
| 2010/0317790 A1 | 12/2010 | Jang et al. | |
| 2011/0017955 A1 | 1/2011 | Zhamu et al. | |
| 2011/0114189 A1 | 5/2011 | Crain et al. | |
| 2011/0133134 A1 | 6/2011 | Varma et al. | |
| 2011/0186789 A1 | 8/2011 | Samulski et al. | |
| 2011/0260116 A1* | 10/2011 | Plee ...................... | B82Y 30/00 252/511 |
| 2012/0065299 A1 | 3/2012 | Lukehart et al. | |
| 2012/0068124 A1 | 3/2012 | Dickinson et al. | |
| 2012/0142832 A1 | 6/2012 | Varma et al. | |
| 2012/0264836 A1 | 10/2012 | Felisari et al. | |
| 2013/0018204 A1 | 1/2013 | Jeon et al. | |
| 2013/0072613 A1 | 3/2013 | Miltner et al. | |

(Continued)

FOREIGN PATENT DOCUMENTS

| | | |
|---|---|---|
| CN | 101817516 A | 9/2010 |
| CN | 103842422 A | 6/2014 |

(Continued)

OTHER PUBLICATIONS

Wakabayashi, et al: "Polymer-Graphite Nanocomposites: Effective Dispersion and Major Property Enhancement Via Solid-State Shear Pulverization", Macromulecules, Feb. 29, 2008, vol. 41, No. 6, pp. 1905-1908.

NPL_ThomasSwan; "Elicarb Graphene Epoxy Dispersion", Advanced Materials, Publication [unknown].

NPL_Xie, et al "Boron Nitride Nanosheets as New Barrier Additive for Plastic Packaging", New/Nano Materials. Retrieved from the Internet <URL: https://www.tcd.ie/Physics/research/groups/1d-nanostructures/files/posters/NewNano%20-%2034_poster_Shaobo%20Xie.pdf>, Publication [unknown, no earlier than 2013].

(Continued)

Primary Examiner — Monique R Peets
(74) Attorney, Agent, or Firm — Fox Rothschild LLP

(57) ABSTRACT

A method for forming a graphene-reinforced polymer matrix composite is disclosed. The method includes distributing graphite microparticles into a molten thermoplastic polymer phase; and applying a succession of shear strain events to the molten polymer phase so that the molten polymer phase exfoliates the graphite successively with each event until at least 50% of the graphite is exfoliated to form a distribution in the molten polymer phase of single- and multi-layer graphene nanoparticles less than 50 nanometers thick along the c-axis direction.

24 Claims, 14 Drawing Sheets

(56) References Cited

U.S. PATENT DOCUMENTS

| | | | |
|---|---|---|---|
| 2013/0295367 | A1 | 11/2013 | Compton et al. |
| 2014/0058046 | A1 | 2/2014 | Sawa et al. |
| 2014/0141257 | A1 | 5/2014 | Ranade et al. |
| 2015/0267030 | A1 | 9/2015 | Nosker et al. |
| 2016/0009561 | A1 | 1/2016 | Coleman et al. |
| 2017/0207000 | A1 | 7/2017 | Prestayko et al. |
| 2017/0218141 | A1 | 8/2017 | Nosker et al. |

FOREIGN PATENT DOCUMENTS

| | | | |
|---|---|---|---|
| CN | 104945659 | A | 9/2015 |
| EP | 2287244 | A1 | 2/2011 |
| EP | 2612889 | A1 | 7/2013 |
| JP | H08-053571 | A | 2/1996 |
| JP | 2003-138145 | A | 5/2003 |
| JP | 2003-531802 | A | 10/2003 |
| JP | 2008-266577 | A | 11/2008 |
| JP | 2009-542839 | A | 12/2009 |
| JP | 2011513167 | A | 4/2011 |
| JP | 2012500179 | A | 1/2012 |
| JP | 2012136712 | A | 7/2012 |
| JP | 2013018825 | A | 1/2013 |
| JP | 2013-233790 | A | 11/2013 |
| JP | 2015537075 | A | 12/2015 |
| JP | 2016-519191 | | 6/2016 |
| KR | 10-2011-0018024 | A | 2/2011 |
| KR | 10-2012-0009978 | A | 2/2012 |
| WO | 07145918 | A2 | 12/2007 |
| WO | 2009018204 | A1 | 2/2009 |
| WO | 2009/029984 | A1 | 3/2009 |
| WO | 201007763 | | 9/2010 |
| WO | 2010115173 | A1 | 10/2010 |
| WO | 2011042800 | A1 | 4/2011 |
| WO | 2012013303 | A1 | 2/2012 |
| WO | 2012020099 | A1 | 2/2012 |
| WO | 2012049121 | | 4/2012 |
| WO | 2012049121 | A1 | 4/2012 |
| WO | 2012133303 | | 10/2012 |
| WO | 2013058181 | A1 | 4/2013 |
| WO | 2014062226 | A1 | 4/2014 |
| WO | 2014172619 | A1 | 10/2014 |
| WO | 2015044478 | | 4/2015 |
| WO | 2016018995 | A1 | 2/2016 |
| WO | 16106312 | A2 | 6/2016 |

OTHER PUBLICATIONS

NPL_Jonathan N. Coleman: "Liquid Exfoliation of Defect-Free Graphene", Accounts of Chemical Research, 2013, vol. 46, No. 1, pp. 14-22.

NPL_Paton et al: "Scale-up of Liquid Exfoliation of Graphene", Thomas Swan Advanced Materials, Retrieved from the Internet: URL: https://www.tcd.ie/Physics/research/groups/1d-nanostructures/files/posters/ChemOnTubes%20Poster%20KP.pdf>. Publication [unknown, not earlier than 2014].

NPL_Paton et al: "Scalable Production of Large Quantities of Defect-Free Few-Layer Graphene by Shear Exfoliation in Liquids", Nature Materials, Jun. 2014, vol. 13, pp. 624-630.

Choudhary, et al: "Polymer/Carbon Nanotube Nanoxomposites", Aug. 17, 2011, Chapter 4, pp. 65-90. Retrieved from the Internet: <https://www.intechopen.com/books/carbon-nanotubes-polymer-nanocomposites/polymer-carbon-nanotube-nanocomposites>.

Wakabayashi, K et al., "Polymer—Graphite Nanocomposites: Effective dispersion and major property enhancement via solid-state shear pulverization", Macromolecules, American Chemical Society, US, vol. 41, No. 6, pp. 1905-1908, Feb. 29, 2008.

Bao, C. et al., "Preparation of graphene by pressurized oxidation and multiplex reduction and its polymer nanocomposites by masterbatch-baed melt blending", Journal of Materials Chemistry, vol. 22, No. 13, p. 6088, Jan. 1, 2012.

"Randcastle Extrusion Systems, Inc.", Nov. 1, 2006, retreived from the Internet: URL: http://www.feedscrewdesigns.com/ubb/Forum1/HTML/000521.html retreived on Jun. 9, 2016.

Diez-Pascual, et al: "High-Performance Nanocomposites Based on Polyetherketones", Progress in Materials Science, Pergamon Press, GB, vol. 57, No. 7, Mar. 4, 2012 (Mar. 4, 2012), pp. 1106-1190, XP028514432, ISSN: 0079-6425, DOI: 10.1016/J.PMATSCI.2012.03.003 [retrieved on Mar. 29, 2012].

Rangari et al: "Alignment of Carbon Nanotubes and Reinforcing Effects in Nylon-6 Polymer Composite Fibers", Nanotechnology Instititute of Physics Publishing, GB, vol. 19, No. 24, Jun. 18, 2008 (Jun. 18, 2008), pp. 1-9, XP002679937, ISSN: 0957-4484, DOI: DOI:10.1088/0957-4484/19/24/245703 [retrieved on May 12, 2008].

Peeterbroeck, et al: "How Carbon Nanotube Crushing Can Improve Flame Retardant Behaviour in Polymer Nanocomposites?", Macromolecular Rapid Communications, vol. 28, No. 3, Feb. 2, 2007 (Feb. 2, 2007), pp. 260-264, XP055669652, DE, ISSN: 1022-1336, DOI: 10.1002/marc.200600614.

Lu et al.: "Preparation of Polyethylene/Expanded Graphite Intercalated Composites by In-situ Expanding Method", China Plastics, Jul. 31, 2009, vol. 23, No. 7, pp. 49-54.

Wakabayashi, et al.: "Polymer-Graphite Nanocomposites: Effective Dispersion and Major Property Enhancement via Solid-State Shear Pulverization", Macromolecules, American Chemical Society, Feb. 29, 2008, vol. 41, No. 6, pp. 1905-1908, XP-002743181.

Bao, et al.: "Preparation of Graphene by Pressurized Oxidation and Multiplex Reduction and its Polymer Nanocomposites by Masterbatch-Based Melt Blending", Journal of Materials Chemistry, Jan. 1, 2012, vol. 22, No. 13, pp. 6088-6096.

Randcastle Extrusion Systems, Inc., Nov. 1, 2006, XP055279030, retrieved from the Internet: URL: http://www.feedscrewdesigns.com/ubb/Forum1/HTML/000521.html [retrieved on Jun. 9, 2016], pp. 1-3.

Nixon, A.: "Understanding Graphene-Part 1", Feb. 4, 2016. [retrieved Nov. 18, 2016]. Retrieved from the Internet: <http://investorintel.com/technology-metals-intel/understanding-graphene-part-1-graphene-and-graphite/>.

Novoselov et al., "Electric Field Effect in Atomically Thin Carbon Films," Science (2004); 306:666-669.

Eda, et al: "Chemically Derived Graphene Oxide: Towards Large-Area Thin-Film Electronics and Optoelectronics", Advanced Materials, 2010, vol. 22, pp. 2392-2415.

Choudhary, et al: "Polymer/Carbon Nanotube Nanocomposites", Aug. 17, 2011, Chapter 4, pp. 65-90, Retrieved from the Internet: <http://www.intechopen.com/books/carbon-nanotubes-polymer-nanocomposites/polymer-carbon-nanotube-nanocomposites>.

\* cited by examiner

IN SITU EXFOLIATION METHOD TO FABRICATE A GRAPHENE-REINFORCED POLYMER MATRIX COMPOSITE

CROSS REFERENCE TO RELATED APPLICATIONS

The present application is a Continuation of U.S. Nonprovisional application Ser. No. 14/437,040, filed on Apr. 20, 2015, now U.S. Pat. No. 9,896,565 issued Feb. 20, 2018, which is the National Phase of International Patent Application Serial No. PCT/US/13/31495, filed Mar. 14, 2013, which claims the benefit of priority under 35 U.S.C. § 119(e) of U.S. Provisional Patent Application Ser. No. 61/716,461, filed on Oct. 19, 2012, which is hereby incorporated by reference in its entirety.

TECHNICAL FIELD

The present invention relates to high efficiency mixing methods to transform a polymer composite containing well-crystallized graphite particles into nano-dispersed single or multi-layer graphene particles having various commercial applications.

BACKGROUND OF THE INVENTION

Polymer compositions are being increasingly used in a wide range of areas that have traditionally employed the use of other materials such as metals. Polymers possess a number of desirable physical properties, are light weight, and inexpensive. In addition, many polymer materials may be formed into a number of various shapes and forms and exhibit significant flexibility in the forms that they assume, and may be used as coatings, dispersions, extrusion and molding resins, pastes, powders, and the like.

The various applications for which it would be desirable to use polymer compositions require materials with electrical conductivity. However, a significant number of polymeric materials fail to be intrinsically electrically or thermally conductive enough for many of these applications.

Graphene is a substance composed of pure carbon in which atoms are positioned in a hexagonal pattern in a densely packed one-atom thick sheet. This structure is the basis for understanding the properties of many carbon-based materials, including graphite, large fullerenes, nano-tubes, and the like (e.g., carbon nano-tubes are generally thought of as graphene sheets rolled up into nanometer-sized cylinders). Graphene is a single planar sheet of $sp^2$ bonded carbon atoms. Graphene is not an allotrope of carbon because the sheet is of finite size and other elements can be attached at the edge in non-vanishing stoichiometric ratios.

When used to reinforce polymers, graphene in any form increases polymer toughness by inhibiting crack propagation. Graphene is also added to polymers and other compositions to provide electrical and thermal conductivity. The thermal conductivity of graphene makes it an ideal additive for thermal management (e.g., planar heat dissipation) for electronic devices and lasers. Some commercial applications of carbon fiber-reinforced polymer matrix composites (CF-PMCs) include aircraft and aerospace systems, automotive, electronics, government defense/security, pressure vessels, and reactor chambers, among others.

Progress in the development of low cost methods to effectively produce graphene-reinforced polymer matrix composites (G-PMCs) remains very slow. Currently, some of the challenges that exist affecting the development of G-PMCs viable for use in real world applications are that the materials used are expensive and the presently used chemical or mechanical manipulations have not been practical for large-scale commercial production. It would thus be desirable for a low cost method to produce a G-PMC suitable for large-scale commercial production that offers many property advantages, including increased specific stiffness and strength, enhanced electrical/thermal conductivity, and retention of optical transparency.

SUMMARY OF THE INVENTION

The present disclosure provides polymer processing methods to fabricate a graphene-reinforced polymer matrix composite (G-PMC) by elongational flow and folding of well-crystallized graphite particles dispersed in a molten polymer matrix.

In one aspect, there is provided herein a method for forming a graphene-reinforced polymer matrix composite, including: distributing graphite microparticles into a molten thermoplastic polymer phase; and applying a succession of shear strain events to the molten polymer phase so that the molten polymer phase exfoliates the graphite successively with each event until at least 50% of the graphite is exfoliated to form a distribution in the molten polymer phase of single- and multi-layer graphene nano-particles less than 50 nanometers thick along a c-axis direction.

In certain embodiments, the graphite particles may be prepared by crushing and grinding a graphite-containing mineral to millimeter-sized dimensions.

In certain embodiments, the millimeter-sized particles may be reduced to micron-sized dimensions using ball milling or attritor milling.

In certain embodiments, the graphite particles are extracted from the micron-sized particle mixture by a flotation method.

In certain embodiments, the extracted graphite particles may be incorporated in a polymer matrix using a single screw extruder with axial fluted extensional mixing elements or spiral fluted extensional mixing elements.

In certain embodiments, the graphite-containing polymer matrix is subjected to repeated extrusion to induce exfoliation of the graphitic material, thus forming a uniform dispersion of graphene nanoparticles in the polymer matrix.

In certain embodiments, the polymer is selected from the group consisting of polyether-etherketones, polyetherketones, polyphenylene sulfides, polyethylene sulfides, polyetherimides, poly-vinylidene fluorides, polysulfones, polycarbonates, polyphenylene ethers/oxides, nylons, aromatic thermo-plastic polyesters, aromatic polysulfones, thermoplastic polyimides, liquid crystal polymers, thermoplastic elastomers, polyethylenes, polypropylenes, polystyrene, polymethylmethacrylate, polyacrylonitrile, ultra-high-molecular-weight polyethylene, polytetrafluoroethylene, acrylonitrile butadiene styrene, polycarbonates, polyamides, polyphenylene oxide, polyphenylene sulfide, polyoxymethylene plastic, polyimides, polyaryletherketones, polyetherimide, polyvinylchloride, polyvinylidine fluoride, acrylics, polyphenylene sulfide, polyphenylene oxide, and mixtures thereof.

In certain embodiments, in combination with other embodiments, the succession of shear strain events may be applied until at least 50% of the graphite is exfoliated to form a distribution in the molten polymer phase of single- and multi-layer graphene nanoparticles less than 25 nanometers thick along the c-axis direction.

In certain embodiments, in combination with other embodiments, the succession of shear strain events may be applied until at least 50% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 90% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 80% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 75% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 70% of the graphite is exfoliated to form a distribution in the molten polymer phase of single- and multi-layer graphene nanoparticles less than 10 nanometers thick along the c-axis direction.

In certain embodiments, in combination with other embodiments, the succession of shear strain events may be applied until at least 60% of the graphite is exfoliated to form a distribution in the molten polymer phase of single- and multi-layer graphene nanoparticles less than 10 nanometers thick along the c-axis direction.

In certain embodiments, in combination with other embodiments, the graphite may be doped with other elements to modify a surface chemistry of the exfoliated graphene nanoparticles.

In certain embodiments, in combination with other embodiments, the graphite is expanded graphite.

In certain embodiments, in combination with other embodiments, a surface chemistry or nano structure of the dispersed graphite may be modified to enhance bond strength with the polymer matrix to increase strength and stiffness of the graphene composite.

In certain embodiments, in combination with other embodiments, a directional alignment of the graphene nanoparticles is used to obtain one-, two- or three-dimensional reinforcement of the polymer matrix phase.

DETAILED DESCRIPTION OF THE INVENTION

Figure 1:
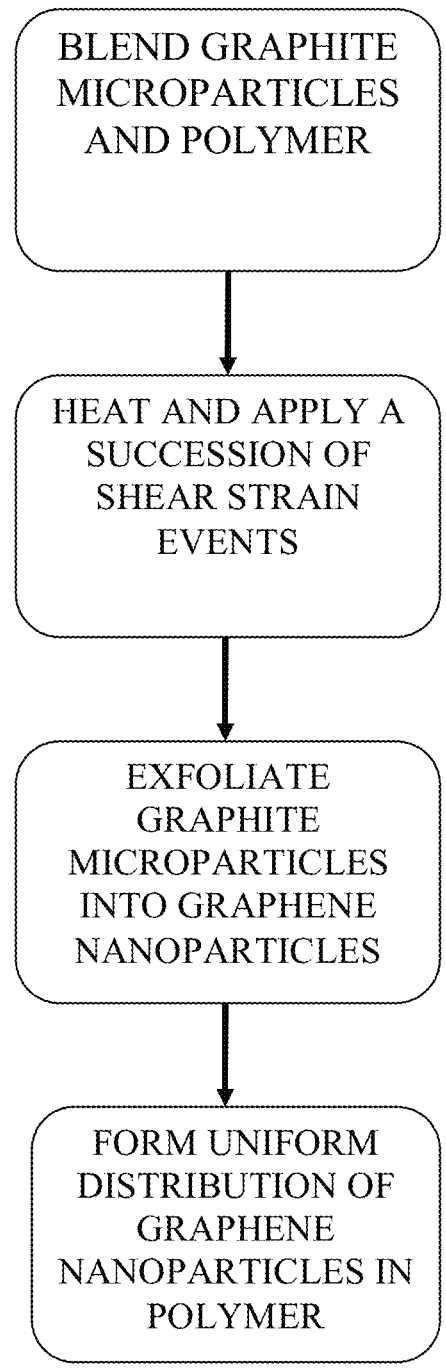
FIG. 1 is a flowchart illustrating various steps that an in situ exfoliation method of fabricating a graphene-reinforced polymer matrix composite may implement.

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

The following term(s) shall have, for purposes of this application, the respective meanings set forth below:

The term "graphene" refers to the name given to a single layer of carbon atoms densely packed into a benzene-ring structure. Graphene, when used alone, may refer to multi-layer graphene, graphene flakes, graphene platelets, and few layer graphene or single layer graphene in a pure and uncontaminated form.

The present invention provides a high efficiency mixing method to transform a polymer composite that contains well-crystallized graphite particles into nano-dispersed single or multi-layer graphene particles. The method involves in situ exfoliation of the graphite layers by compounding in a batch mixer or extruder that impart repetitive, high shear strain rates. In both processes, longer mixing times provide enhanced exfoliation of the graphite into graphene nanoparticles within the polymer matrix composite (PMC). In addition, additives may be used to promote sufficient graphene/polymer bonding, thereby yielding a low density graphene-reinforced polymer matrix composite (G-PMC). The method is low cost to produce a G-PMC that offers numerous property advantages, including increased specific stiffness and strength, enhanced electrical/thermal conductivity, and retention of optical transparency.

Repeated compounding during a batch mixing process or single screw extrusion is used to progressively transform the initial graphite-particle dispersion into a uniform nano-dispersion of discrete graphene nanoparticles. In some cases, an inert gas or vacuum may be used during processing. The method is described herein as "mechanical" exfoliation to distinguish it from "chemical" exfoliation, which is the primary thrust of much of today's research. An advantage of the mechanical method is that contamination-free graphene-polymer interfaces are formed during high-shear mixing, thus ensuring good interface adhesion or bonding. Other advantages of in situ exfoliation are that it avoids making and handling graphene flakes, as well as dispersing them uniformly in the polymer matrix phase.

Depending on the number of in situ shear strain events, the method provides multi-layer graphene, graphene flakes, graphene platelets, few layer graphene or single layer graphene in a pure and uncontaminated form. Platelets have diamond-like stiffness and are used for polymer reinforcement. Graphene in any form increases polymer toughness by inhibiting crack propagation as a reinforcement for polymers. Graphene may be used as an additive to polymers and other compositions to provide electrical and thermal conductivity. The thermal conductivity of graphene makes it a desirable additive for thermal management for electronic devices and lasers.

Graphite, the starting material from which graphene is formed, is composed of a layered planar structure in which the carbon atoms in each layer are arranged in a hexagonal lattice. The planar layers are defined as having an "a" and a "b" axis, with a "c" axis normal to the plane defined by the "a" and "b" axes. The graphene particles produced by the inventive method have an aspect ratio defined by the "a" or "b" axis distance divided by the "c" axis distance. Aspect ratio values for the inventive nanoparticles exceed 25:1 and typically range between 50:1 and 1000:1.

It should be understood that essentially any polymer inert to graphite capable of imparting sufficient shear strain to exfoliate graphene from the graphite may be used in the method of the present invention. Examples of such polymers include, but are not limited to, polyetheretherketone (PEEK), polyetherketone (PEK), poly-phenylene sulfide (PPS), polyethylene sulfide (PES), polyetherimide (PEI), polyvinylidene fluoride (PVDF), polysulfone (PSU), polycarbonate (PC), polyphenylene ether/oxide, nylons, aromatic thermoplastic polyesters, aromatic polysulfones, thermoplastic polyimides, liquid crystal polymers, thermoplastic elastomers, polyethylene, polypropylene, polystyrene (PS), polymethylmethacrylate (PMMA), polyacrylonitrile (PAN), ultra-high-molecular-weight polyethylene (UHMWPE), polytetrafluoroethylene (PTFE/Teflon), acrylonitrile butadiene styrene (ABS), polycarbonates (PC), polyamides (PA), polyphenylene oxide (PPO), polyphenylene sulfide (PPS), polyoxymethylene plastic (POM/Acetal), polyimides, polyaryletherketones, polyetherimide (PEI), polyvinylchloride (PVC), polyvinylidine fluoride (PVDF), acrylics, polyphenylene sulfide (PPS), polyphenylene oxide (PPO), mixtures thereof, and the like. Polymers capable of wetting the graphite surface may be used as well as high melting point, amorphous polymers in accordance with the method of the present invention.

The graphene may be produced as a graphene-polymer mixture suitable for use as-is as a G-PMC that can be pelletized by conventional means for subsequent fabrication processing. Alternatively, higher concentrations of graphite may be used at the outset to provide a graphene-polymer masterbatch in concentrated form that can also be pelletized and then used to add graphene to polymer compositions as a reinforcing agent. As a further alternative, the graphene may be separated from the polymer, for example, by combustion or selective dissolution, to provide essentially pure particles of graphene.

Graphene-reinforced polymers according to the present invention typically contain between about 0.1 and about 30 wt % graphene. More typically, the polymers contain between about 1.0 and about 10 wt % graphene. Polymer masterbatches typically contain between about 5 and about 50 wt % graphene, and more typically between about 10 and about 30 wt % graphene.

The availability of graphite-rich mineral deposits, containing relatively high concentrations (e.g., about 20%) of well-crystallized graphite, makes for a low cost and virtually inexhaustible source of raw material. As discussed below, the extraction of graphite particles from mined material can be accomplished in a cost-effective manner. Synthetic graphite of high purity and exceptional crystallinity (e.g., pyrolytic graphite) may also be used for the same purpose. However, in this case, the batch mixing or extrusion compounding-induced exfoliation process creates a laminated composite, in which the graphene nanoparticles are oriented over a relatively large area. Such laminated composites may be preferred for specific applications.

Mechanical exfoliation of graphite within a polymer matrix may be accomplished by a polymer processing technique that imparts repetitive high shear strain events to mechanically exfoliate graphite microparticles into multi- or single-layer graphene nanoparticles within the polymer matrix.

For purposes of the present invention, graphite microparticles are defined as graphite in which at least 50% of the graphite consists of multilayer graphite crystals ranging between 1.0 and 1000 microns thick along the c-axis of the lattice structure. Typically 75% of the graphite consists of crystals ranging between 100 and 750 microns thick. Expanded graphite may also be used. Expanded graphite is made by forcing the crystal lattice planes apart in natural flake graphite, thus expanding the graphite, for example, by immersing flake graphite in an acid bath of chromic acid, then concentrated sulfuric acid. Expanded graphite suitable for use in the present invention include expanded graphite with opened edges at the bilayer level, such as MESOGRAF.

A succession of shear strain events is defined as subjecting the molten polymer to an alternating series of higher and lower shear strain rates over essentially the same time intervals so that a pulsating series of higher and lower shear forces associated with the shear strain rate are applied to the graphite particles in the molten polymer. Higher and lower shear strain rates are defined as a first, higher, shear strain rate that is at least twice the magnitude of a second, lower shear strain rate. The first shear strain rate will range between 100 and 10,000 sec$^{-1}$. At least 1,000 to over 10,000,000 alternating pulses of higher and lower shear strain pulses are applied to the molten polymer to form the exfoliated graphene nanoparticles. The number of alternating pulses required to exfoliate graphite particles into graphene particles may be dependent on the original graphite particle dimensions at the beginning of this process, i.e., smaller original graphite particles may need a fewer number of alternating pulses to achieve graphene than larger original graphite particles. This can be readily determined by one of ordinary skill in the art guided by the present specification without undue experimentation.

After high-shear mixing, the graphene flakes in the molten polymer are uniformly dispersed, randomly oriented, and have high aspect ratio. Orientation of the graphene may be achieved by many different methods. Conventional drawing, rolling, and extrusion methods may be used to directionally align the graphene within the PMC fiber, filament, ribbon, sheet, or any other long-aspect shape. The method to fabricate and characterize a G-PMC is comprised of four main steps and is further described below:

1. Extraction of crystalline graphite particles from a mineral source;
2. Incorporation of the extracted graphite particles into a polymer matrix phase and conversion of the graphite-containing polymer into a graphene-reinforced polymer matrix composite (G-PMC) by a high efficiency mixing/exfoliation process;

3. Morphology analysis to determine the extent of mechanical exfoliation and distribution of multi-layer graphene and graphene nanoparticles; and 4. X-ray diffraction analysis to determine multi-layer graphene or graphene crystal size as a function of mechanical exfoliation.

Highly crystalline graphite may be extracted from graphite ore by a multi-step process, as described below.

1. Crushing: A drilled rod of graphite ore from the mine may be placed in a vice and crushed.

2. Grinding: The crushed graphite ore may be then ground by mortar and pestle.

3. Size Reduction: The ground graphite ore may be placed in a sieve with a 1 mm mesh size and size reduced. Larger pieces that do not pass through the screen may be ground by mortar and pestle and then size reduced through the 1 mm mesh size again. Eventually, all of the material passed through the 1 mm mesh size to obtain graphite ore powder.

4. Density Separation by Water: The 1 mm sized powder may be placed in a column filled with water and agitated until a clear separation formed between the more dense portions of the solids and the less dense portions. Graphite is near the density of water (1 g/cm$^3$), while silicon is much more dense (2.33 g/cm$^3$). The uppermost materials are siphoned off with the water and then dried. The dried powder graphite is referred to as Separated Mineral Graphite (SMG).

In commercial practice, very large crushing and grinding machines are available to produce tonnage quantities of mixed powders, from which the graphite component can be separated by standard floatation methods.

Referring now to FIG. 1, a method according to the present disclosure is depicted in a flow chart illustrating the various steps that an in situ exfoliation method of fabricating a G-PMC may implement. In this method, a polymer that is uniformly blended with micron-sized crystalline graphite particles is subjected to repeated compounding-element processing during batch mixing or extrusion at a temperature where the polymer adheres to the graphite particles. Typical polymers have a heat viscosity (without graphite) greater than 100 cps at the compounding temperature. The compounding temperature will vary with the polymer and can range between room temperature (for polymers that are molten at room temperature) and 600° C. Typical compounding temperatures will range between 180° C. and 400° C.

In one embodiment, the extrusion compounding elements are as described in U.S. Pat. No. 6,962,431, the disclosure of which is incorporated herein by reference, with compounding sections, known as axial fluted extensional mixing elements or spiral fluted extensional mixing elements. The compounding sections act to elongate the flow of the polymer and graphite, followed by repeated folding and stretching of the material. This results in superior distributive mixing, which in turn, causes progressive exfoliation of the graphite particles into discrete graphene nanoparticles. Batch mixers may also be equipped with equivalent mixing elements.

Thus, the effect of each compounding pass is to shear-off graphene layers one after the other, such that the original graphite particles are gradually transformed into a very large number of graphene nanoparticles. After an appropriate number of such passes, the final result is a uniform dispersion of discrete graphene nanoparticles in the polymer matrix phase. Longer mixing times or a larger number of passes through the compounding elements provide smaller graphite crystal size and enhanced exfoliation of graphite into graphene nanoparticles within the polymer matrix, however, the shear events should not be of a duration that would degrade the polymer.

As the density of graphene nanoparticles increases during multi-pass extrusion, the viscosity of the polymer matrix increases, due to the influence of the growing number of polymer/graphene interfaces. To ensure continued refinement of the composite structure, the extrusion parameters are adjusted to compensate for the higher viscosity of the composite.

Automated extrusion systems are available to subject the composite material to as many passes as desired, with mixing elements as described in U.S. Pat. No. 6,962,431, and equipped with a re-circulating stream to direct flow back to the extruder input. Since processing of the graphene-reinforced PMC is direct and involves no handling of graphene particles, fabrication costs are low.

In order to mechanically exfoliate graphite into multi-layer graphene and/or graphene, the shear strain rate generated in the polymer during processing must cause a shear stress in the graphite particles greater than the critical stress required to separate two layers of graphite, or the interlayer shear strength (ISS). The shear strain rate within the polymer is controlled by the type of polymer and the processing parameters, including the geometry of the mixer, processing temperature, and revolutions per minute (RPM).

The required processing temperature and RPM for a particular polymer is determinable from polymer rheology data given that, at a constant temperature, the shear strain rate ($\dot{\gamma}$) is linearly dependent upon RPM, as in Equation 1. The geometry of the mixer appears as the rotor radius, r, and the space between the rotor and the barrel, $\Delta r$.

$$\dot{\gamma} = \left(\frac{2\pi r}{\Delta r}\right)\left(\frac{RPM}{60}\right) \qquad \text{Equation 1}$$

Figure 2:
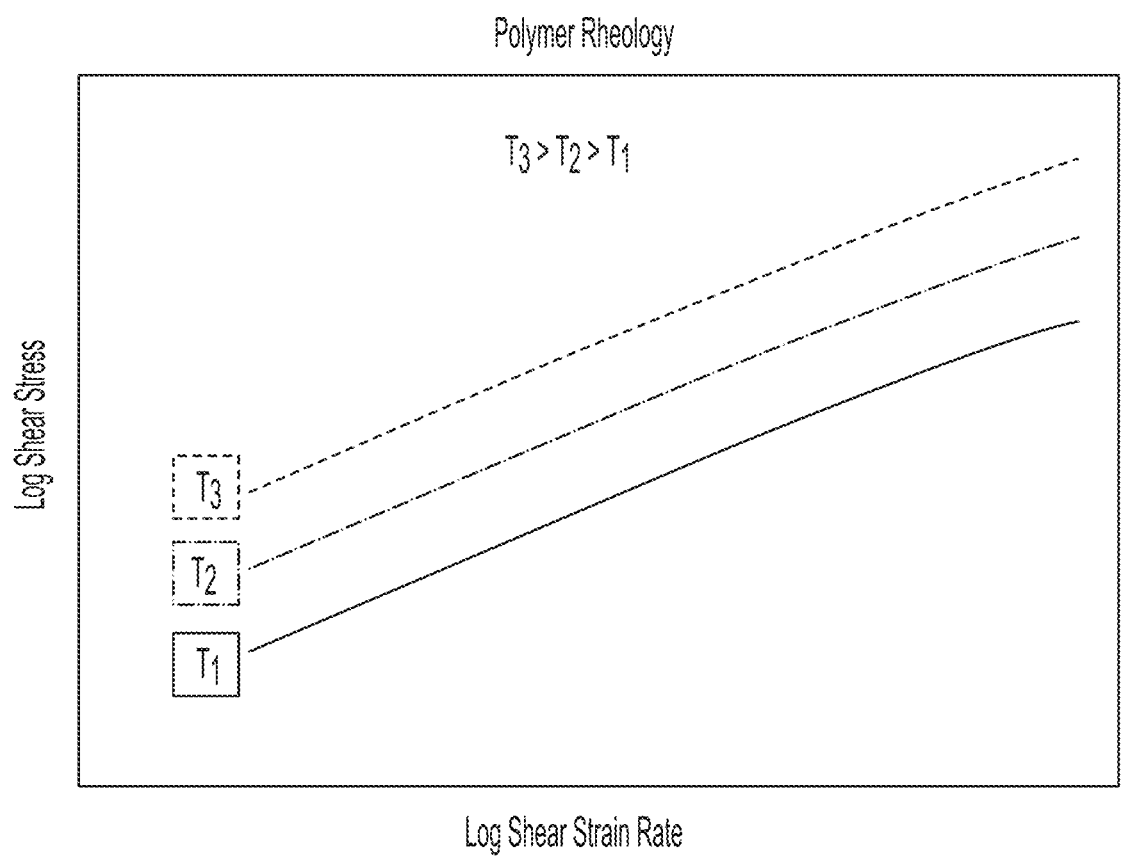
FIG. 2 is a graph illustrating the log shear stress versus the log shear strain rate collected for a polymer at three different constant temperatures.
Figure 3A:
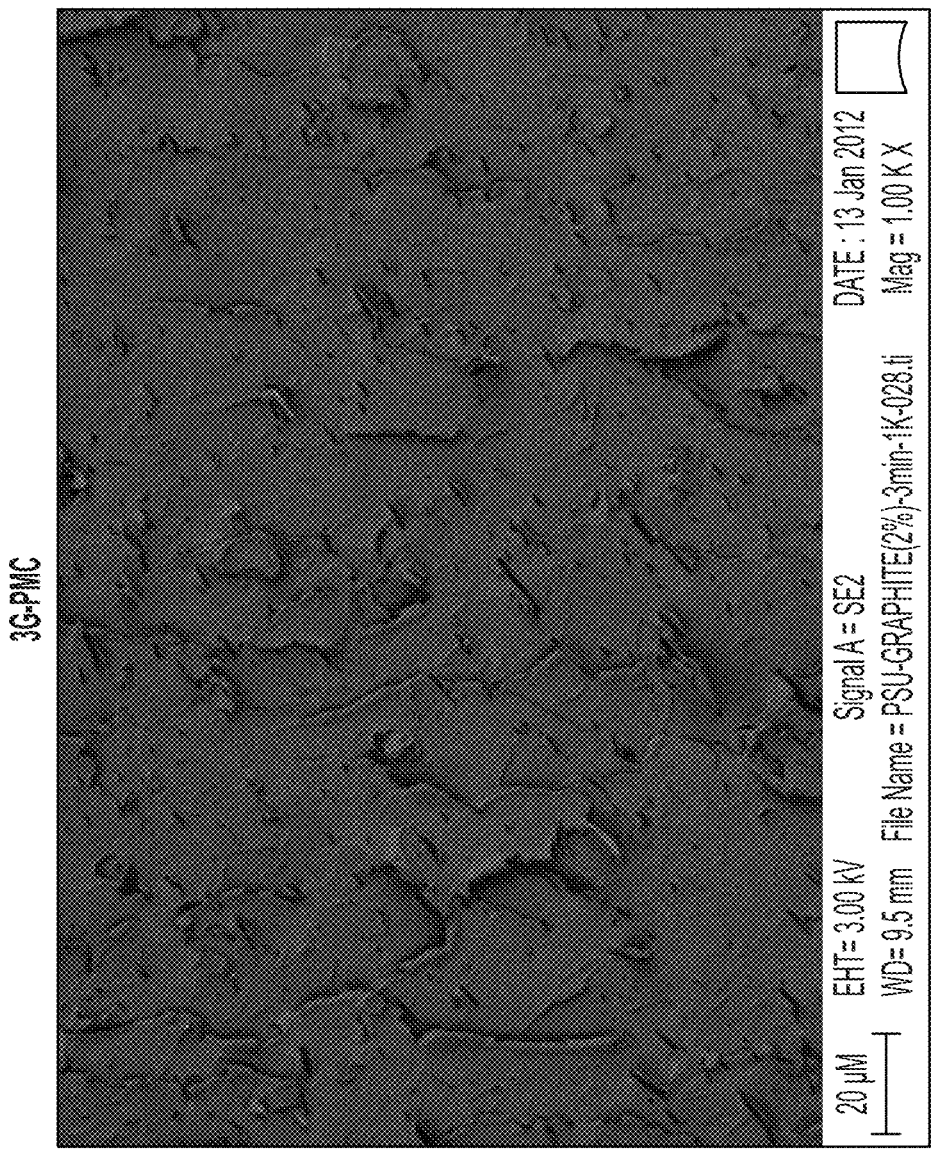
FIG. 3 illustrates the morphology analysis of 2% graphite exfoliated in polysulfone at mixing times of 3 minutes, 30 minutes, and 90 minutes according to an in situ exfoliation method of the present disclosure.
Figure 3B:
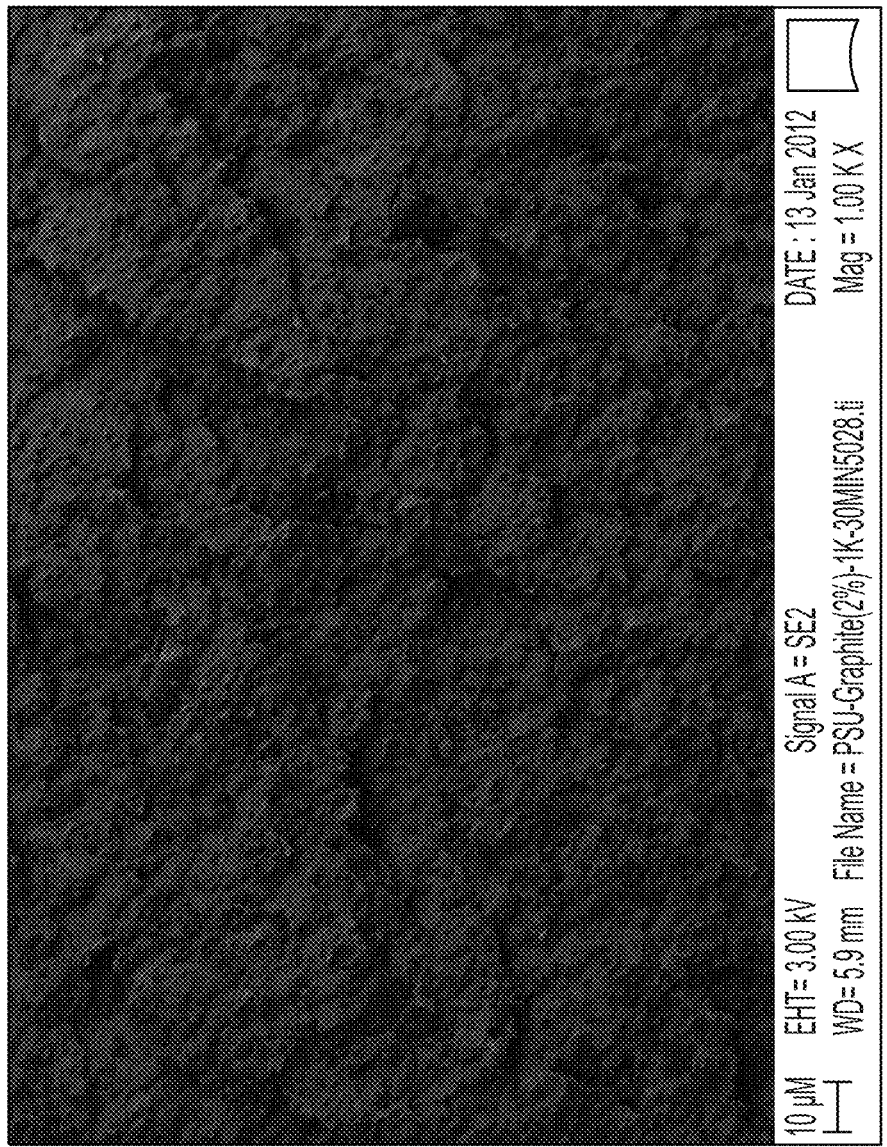
Figure 3C:
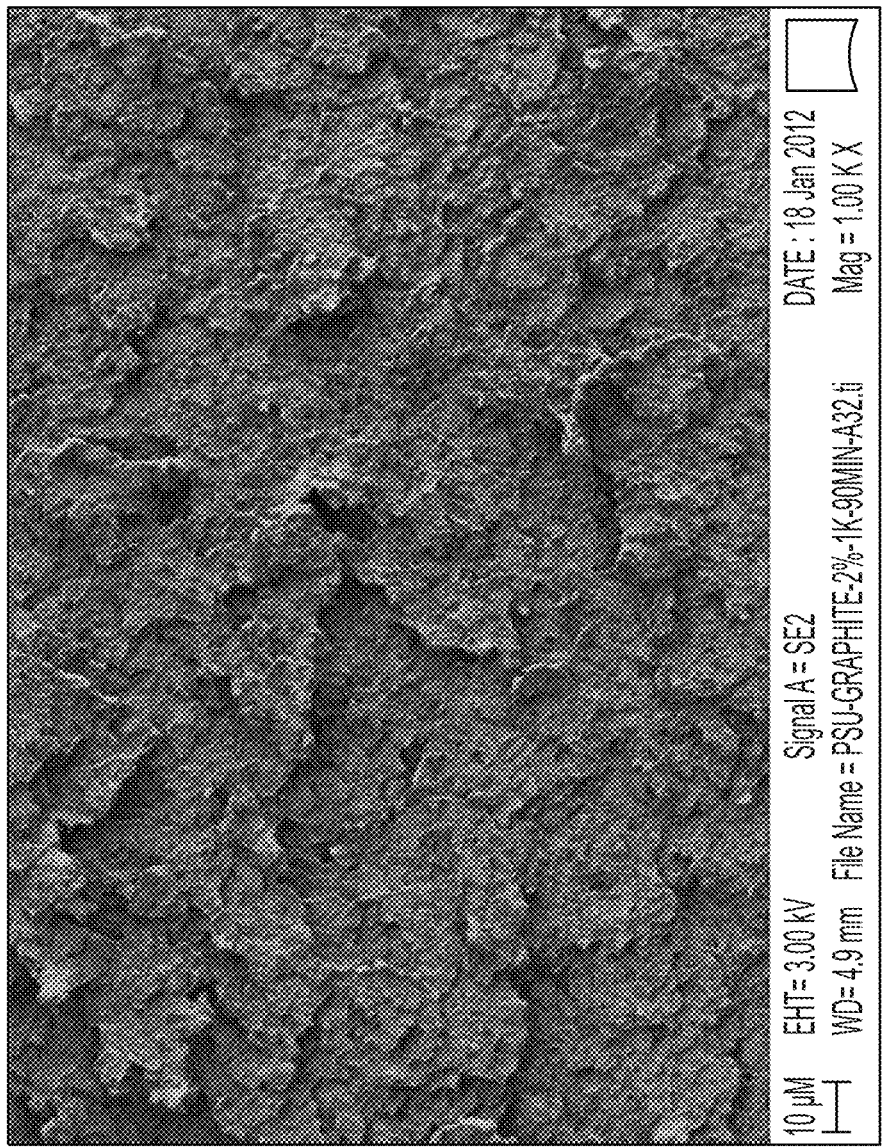
Figure 3D:
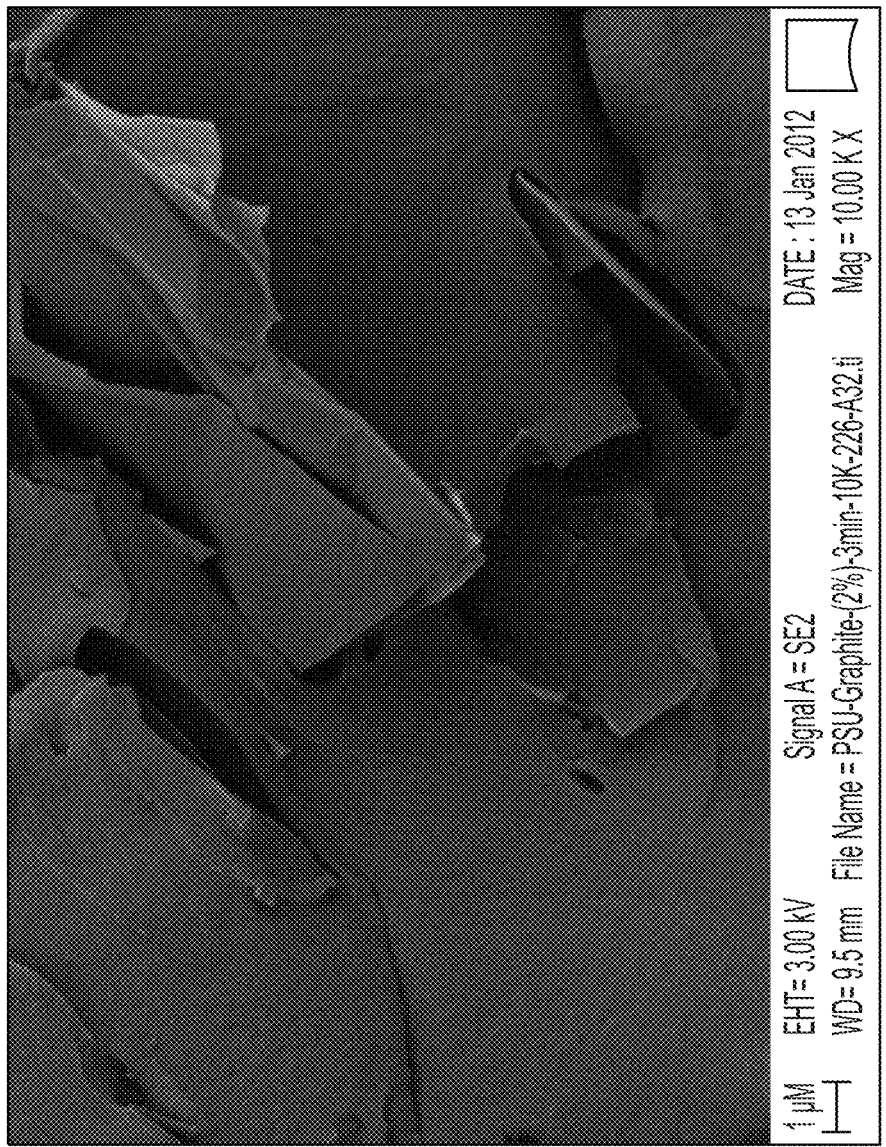
Figure 3E:
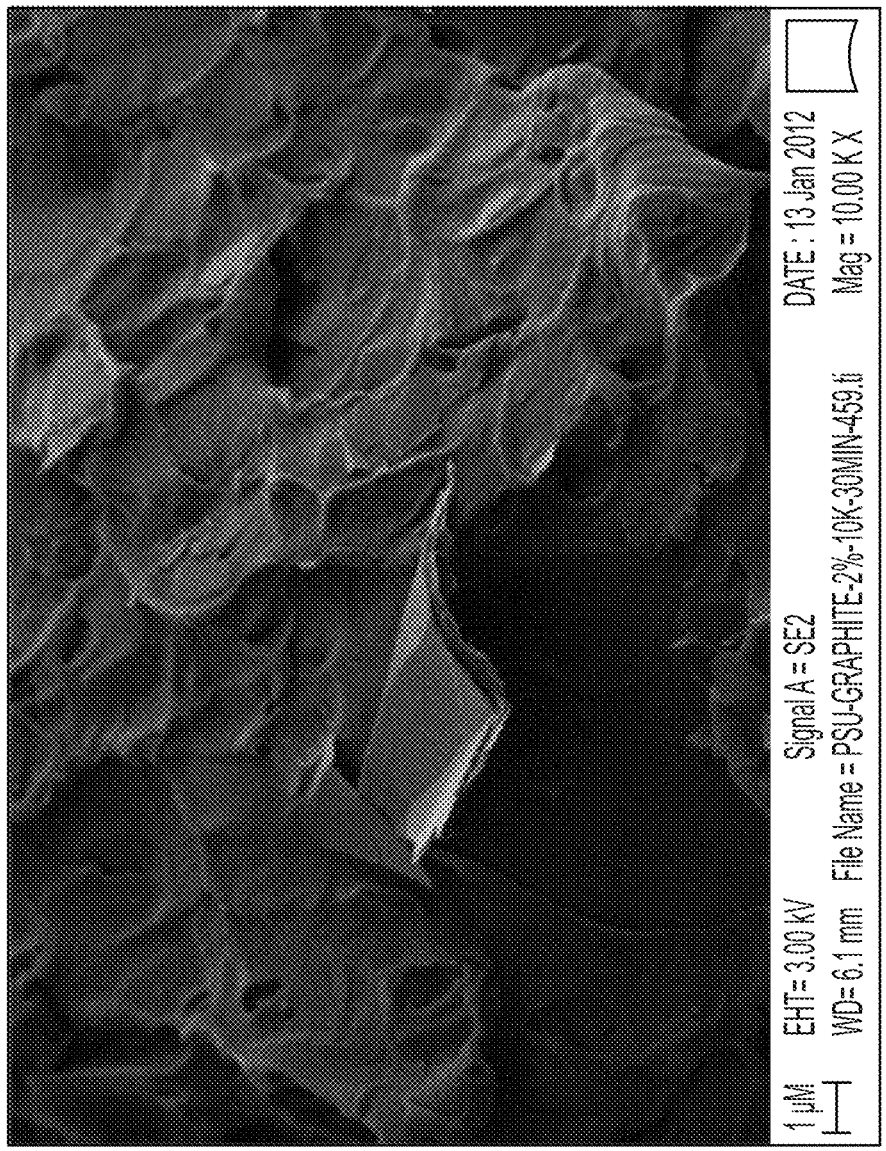
Figure 3F:
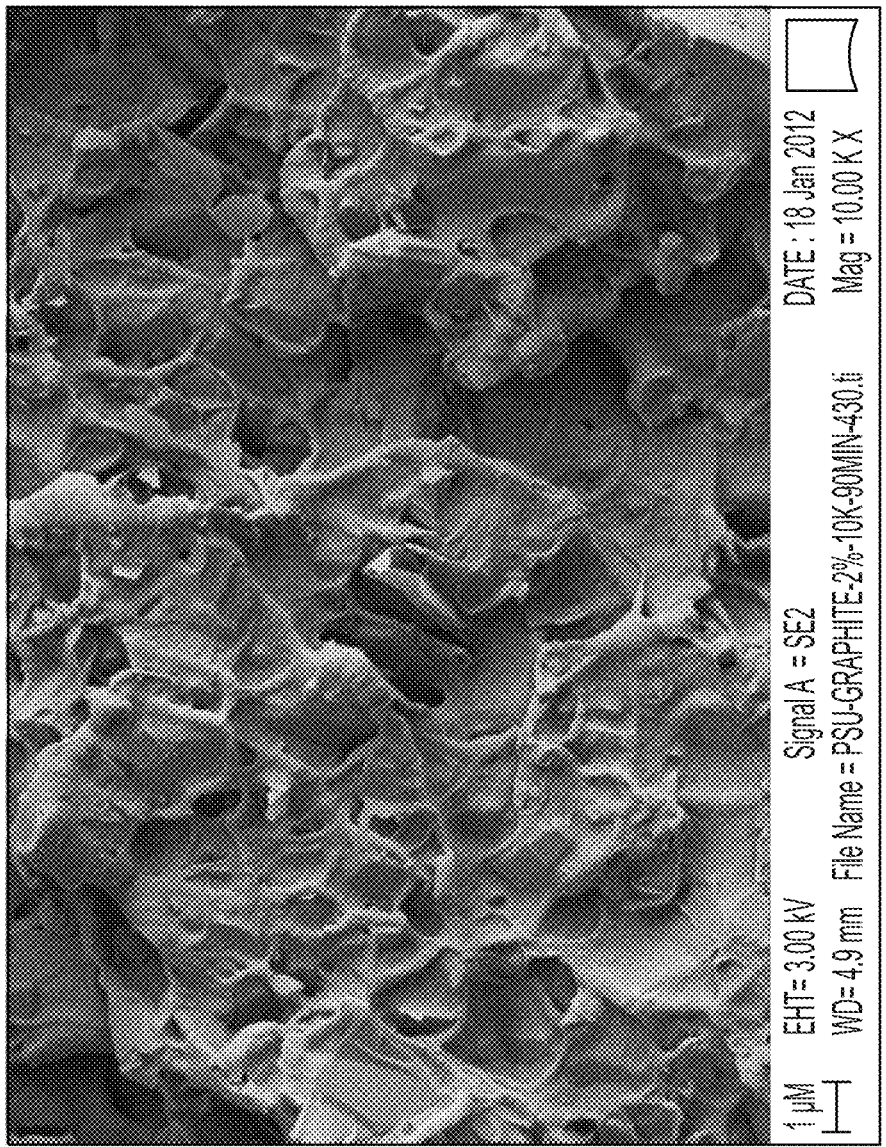
Figure 3G:
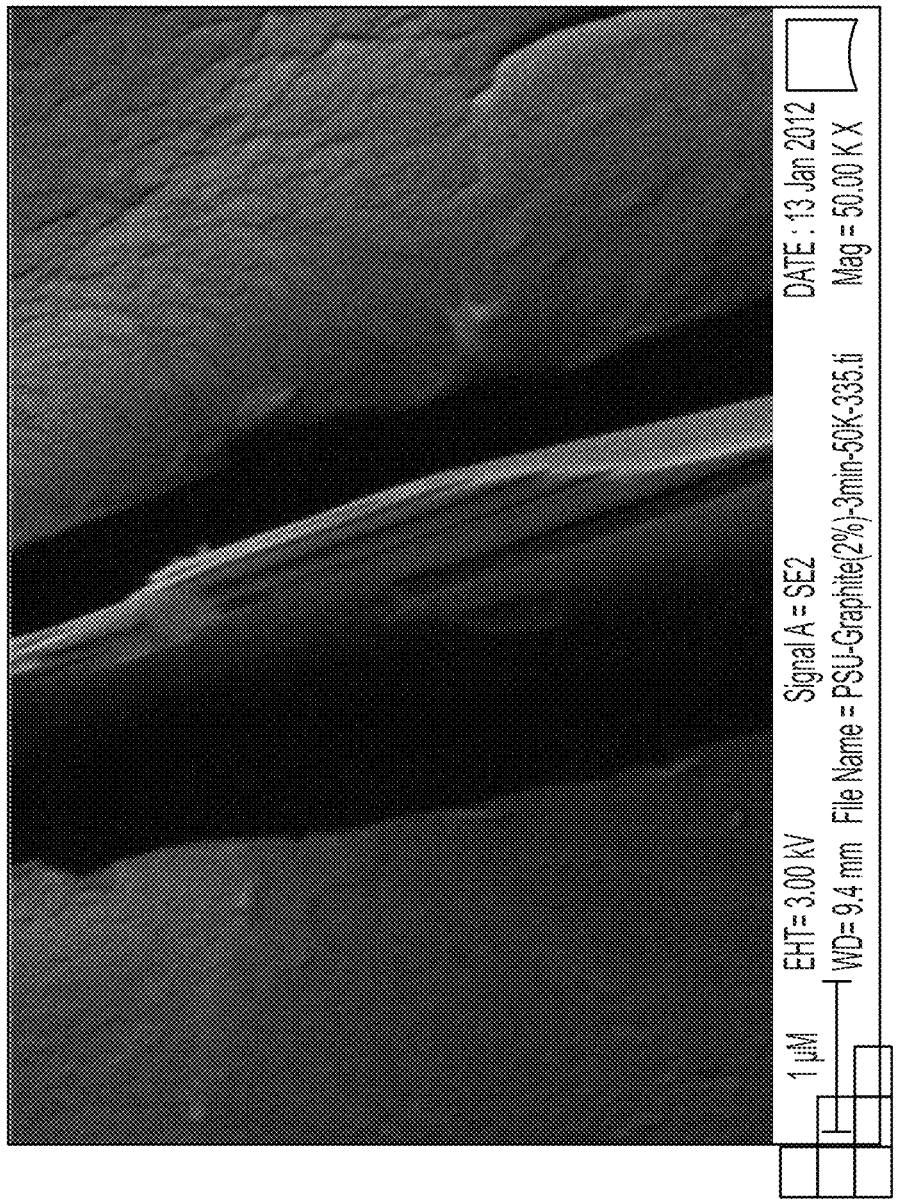
Figure 3H:
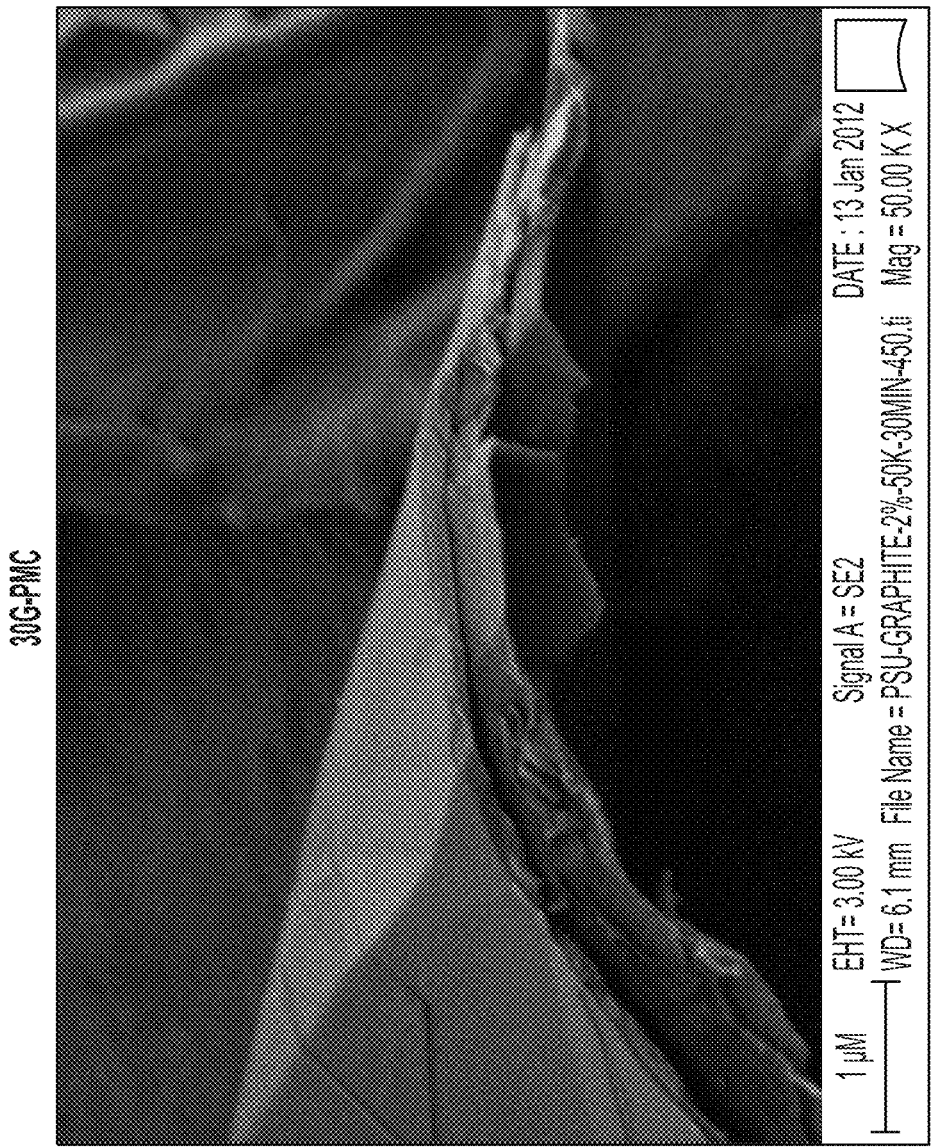
Figure 3I:
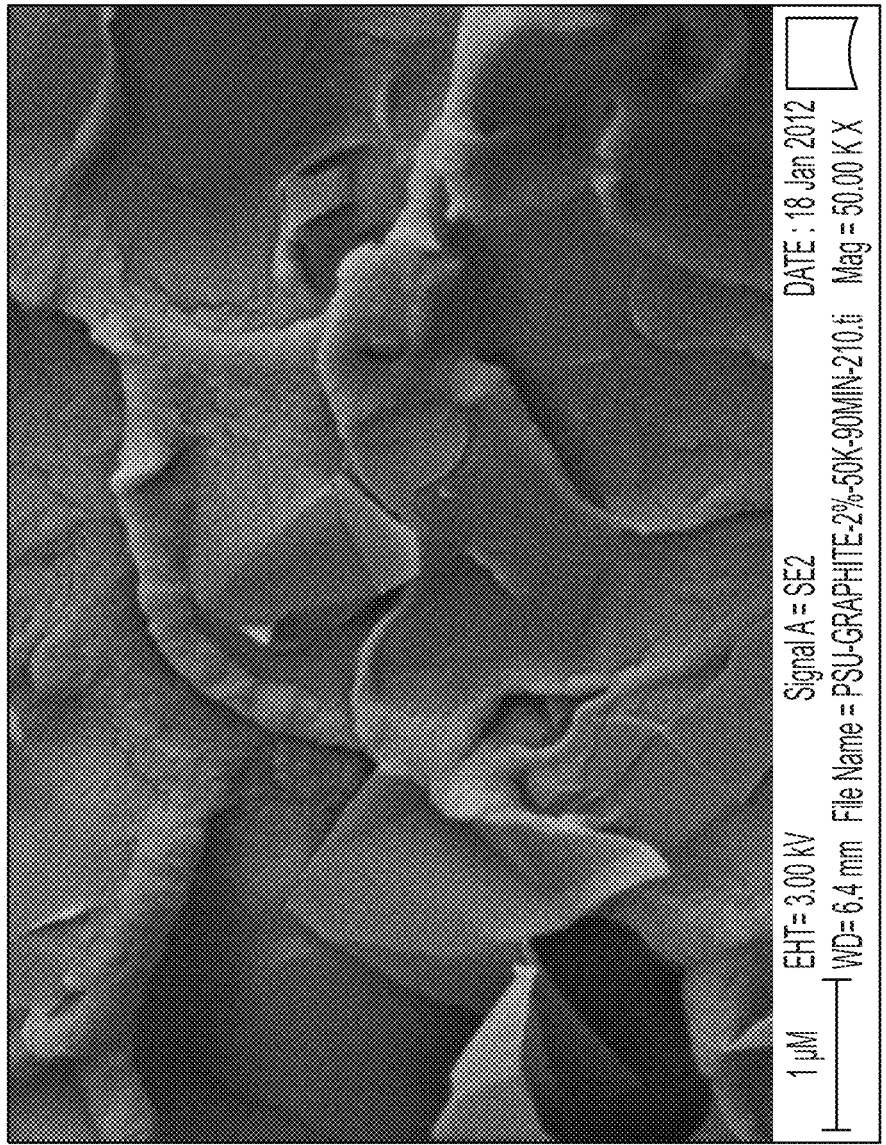

Polymer rheology data collected for a particular polymer at three different temperatures provides a log shear stress versus log shear strain rate graph, as illustrated in FIG. 2. The ISS of graphite ranges between 0.2 MPa-7 GPa, but a new method has quantified the ISS at 0.14 GPa. Thus, to mechanically exfoliate graphite in a polymer matrix during processing, the required processing temperature, shear strain rate, and RPM is determinable for a particular polymer from FIG. 2 so that the shear stress within the polymer is equal to or greater than the ISS of graphite. Under typical processing conditions, polymers have sufficient surface energy to behave like the sticky side of scotch tape, and thus are able to share the shear stress between the polymer melt and the graphite particles.

In one embodiment, a method for forming a G-PMC includes distributing graphite microparticles into a molten thermoplastic polymer phase. A succession of shear strain events are then applied to the molten polymer phase so that the molten polymer phase exfoliates the graphite successively with each event until at least 50% of the graphite is exfoliated to form a distribution in the molten polymer phase of single- and multi-layer graphene nanoparticles less than 50 nanometers thick along a c-axis direction.

In certain embodiments, the graphite particles may be prepared by crushing and grinding a graphite-containing mineral to millimeter-sized dimensions. The millimeter-sized particles may be reduced to micron-sized dimensions using ball milling and attritor milling.

In certain embodiments, the graphite particles may be extracted from the micron-sized particle mixture by a flotation method. The extracted graphite particles may be incorporated in a polymer matrix using a single screw extruder with axial fluted extensional mixing elements or spiral fluted extensional mixing elements. The graphite-containing polymer matrix is subjected to repeated extrusion as described herein to induce exfoliation of the graphitic material, thus forming a uniform dispersion of graphene nanoparticles in the polymer matrix.

In other embodiments, the succession of shear strain events may be applied until at least 50% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 90% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 80% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 75% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 70% of the graphite is exfoliated to form a distribution in the molten polymer phase of single- and multi-layer graphene nanoparticles less than 10 nanometers thick along the c-axis direction.

In other embodiments, the succession of shear strain events may be applied until at least 60% of the graphite is exfoliated to form a distribution in the molten polymer phase of single- and multi-layer graphene nanoparticles less than 10 nanometers thick along the c-axis direction.

In other embodiments, the graphite may be doped with other elements to modify the surface chemistry of the exfoliated graphene nanoparticles. The graphite is expanded graphite.

In other embodiments, the surface chemistry or nano structure of the dispersed graphite may be modified to enhance bond strength with the polymer matrix to increase strength and stiffness of the graphene composite.

In other embodiments, directional alignment of the graphene nanoparticles is used to obtain one-, two- or three-dimensional reinforcement of the polymer matrix phase.

EXAMPLE

The present invention is further illustrated by the following example, which should not be construed as limiting in any way. While some embodiments have been illustrated and described, it should be understood that changes and modifications can be made therein in accordance with ordinary skill in the art without departing from the invention in its broader aspects as defined in the following claims.

In one embodiment, a small scale extension mixer with a 10 gram capacity was used to compound 2% of SMG with Udel P-1700 Polysulfone (PSU) at 332° C. (630° F.) and under vacuum for 3, 30, and 90 minutes. The method is described below. Samples collected for characterization after each length of time are referred to as 3G-PMC, 30G-PMC, 90G-PMC.

1. 9.8 grams of PSU were added to the mixer and allowed to become molten.
2. 0.2 grams of SMG were added to the molten PSU and mixed.
3. After 3 minutes of mixing time, 3 grams of the G-PMC were extruded out of the mixer and collected for characterization.
4. 3 grams of 2% SMG in PSU was added to the mixer and mixed.
5. After 30 minutes of mixing time, 3 grams of the G-PMC were extruded out of the mixer and collected for characterization.
6. 3 grams of 2% SMG in PSU was added to the mixer and mixed.
7. After 90 minutes of mixing time, 3 grams of the G-PMC were extruded out of the mixer and collected for characterization.

Morphology Analysis

A Zeiss Sigma Field Emission Scanning Electron Microscope (FESEM) with Oxford EDS was used to determine the degree of mechanical exfoliation of graphite into multi-layer graphene or graphene nanoparticles and the thickness of these particles. An accelerating voltage of 3 kV and working distance of approximately 8.5 mm was used during viewing. Prior to viewing, specimens from each sample of 3G-PMC, 30G-PMC, and 90G-PMC were notched, cryogenically fractured to produce a flat fracture surface, placed under vacuum for at least 24 hours, gold coated, and stored under vacuum.

X-ray Diffraction Analysis (XRD)

XRD analysis on each sample of 3G-PMC, 30G-PMC, and 90G-PMC includes four steps: (1) sample preparation, (2) diffraction pattern acquisition, (3) profile fitting, and (4) out-of-plane (D) crystallite sizes calculation according to the Debye-Scherrer equation.

1. The samples for XRD analysis were prepared by pressing thin films of each sample 3G-PMC, 30G-PMC, and 90G-PMC at 230° C. and 5,500 psi over a 2 minute time period. Each sample was positioned between aluminum sheets prior to pressing using a Carver Uniaxial Press with heated platens.
2. Diffraction patterns of the pressed films were acquired using a Philips XPert powder Diffractometer with sample changer (Xpert) at 40 kV and 45 mA with an incident slit thickness of 0.3 mm from 4°-70° 2θ and a step size of 0.02° 2θ.
3. Diffraction patterns were uploaded into WinPLOTR Powder diffraction graphics tool, without background editing or profile adjustments prior to peak fitting. Single peak fitting was applied at a 2θ range of 26°-27.5°, using a pseudo-Voigt function and taking into account a global FWHM, global eta (proportion of Lorentz), and linear background. Single peak fitting of the profile provides the full width at half maximum (FWHM) of the relevant peak.
4. The average out of-plane crystallite size (D) (sometimes referred to as along the c-axis, and proportional to the number of graphene layers which are stacked) is calculated using the Debye-Scherrer Equation and the (002) FWHM values, for which λ is the X-ray wavelength, coefficient K=0.89, β is the FWHM in radians, and θ is the diffraction angle. The d-spacing is also calculated.

$$D = \frac{K\lambda}{\beta\cos\theta} \qquad \text{Equation 2}$$

Morphology Results

The morphology of each sample, 3G-PMC, 30G-PMC, and 90G-PMC, at three different scales (magnification) is shown in FIG. 3. In (a-c), a 20 μm scale and 1,000× magnification shows good distribution of multi-layer graphene or graphene within the PSU matrix at each mixing time. In (d-f), a 1 μm scale and 10,000× magnification and (g-i), a 1 μm scale and 50,000× magnification shows mechanically exfoliated graphite within the PSU matrix. In (d-i), micro-folding of the multi-layer graphene or graphene is evident, as well as good bonding between the graphene nanoparticles and the polymer matrix.

Figure 4B:
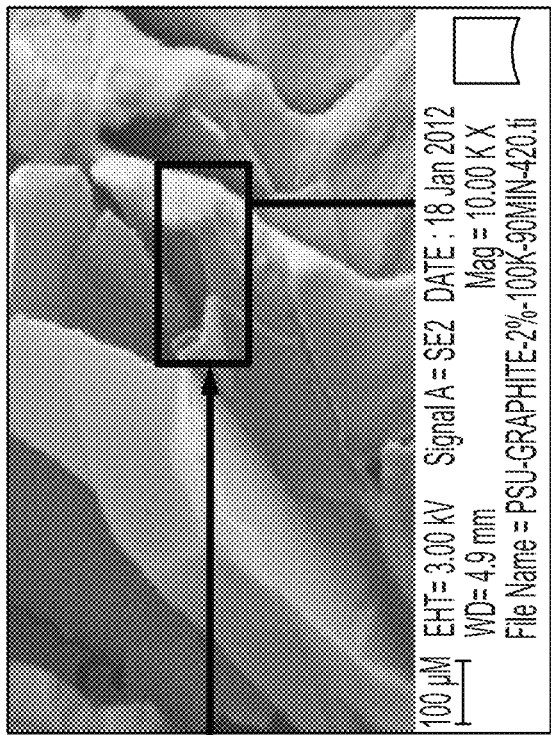
FIG. 4 illustrates micrographs of 90G-PMC at various scales and magnification levels according to an in situ exfoliation method of the present disclosure.
Figure 4C:
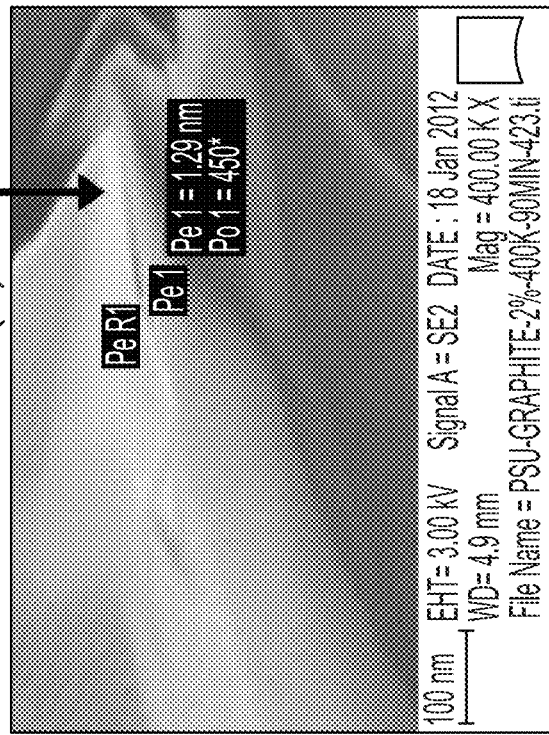
Figure 4A:
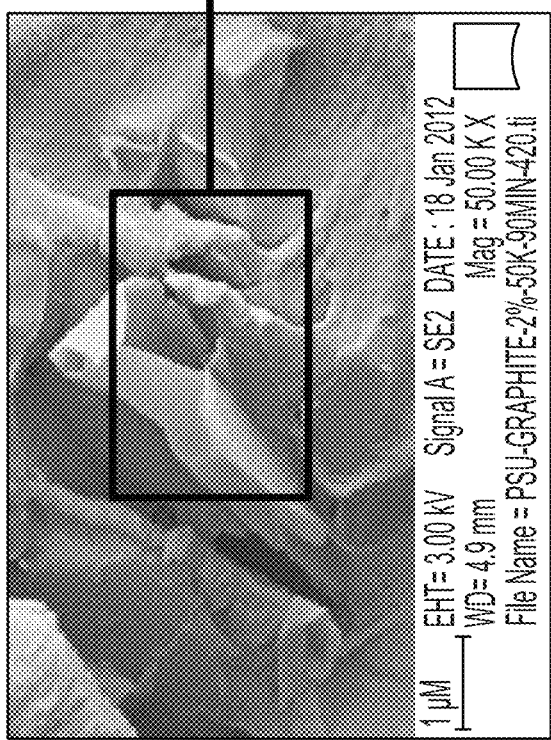

The 90G-PMC sample, the sample mixed for the longest time and exposed to the most repetitive shearing, exhibits superior mechanical exfoliation and the smallest crystal size. As shown in FIG. 4, mechanical exfoliation has reduced the graphene nanoparticle thickness in the 90G-PMC sample to 8.29 nm.

X-ray Diffraction Results

Figure 5:
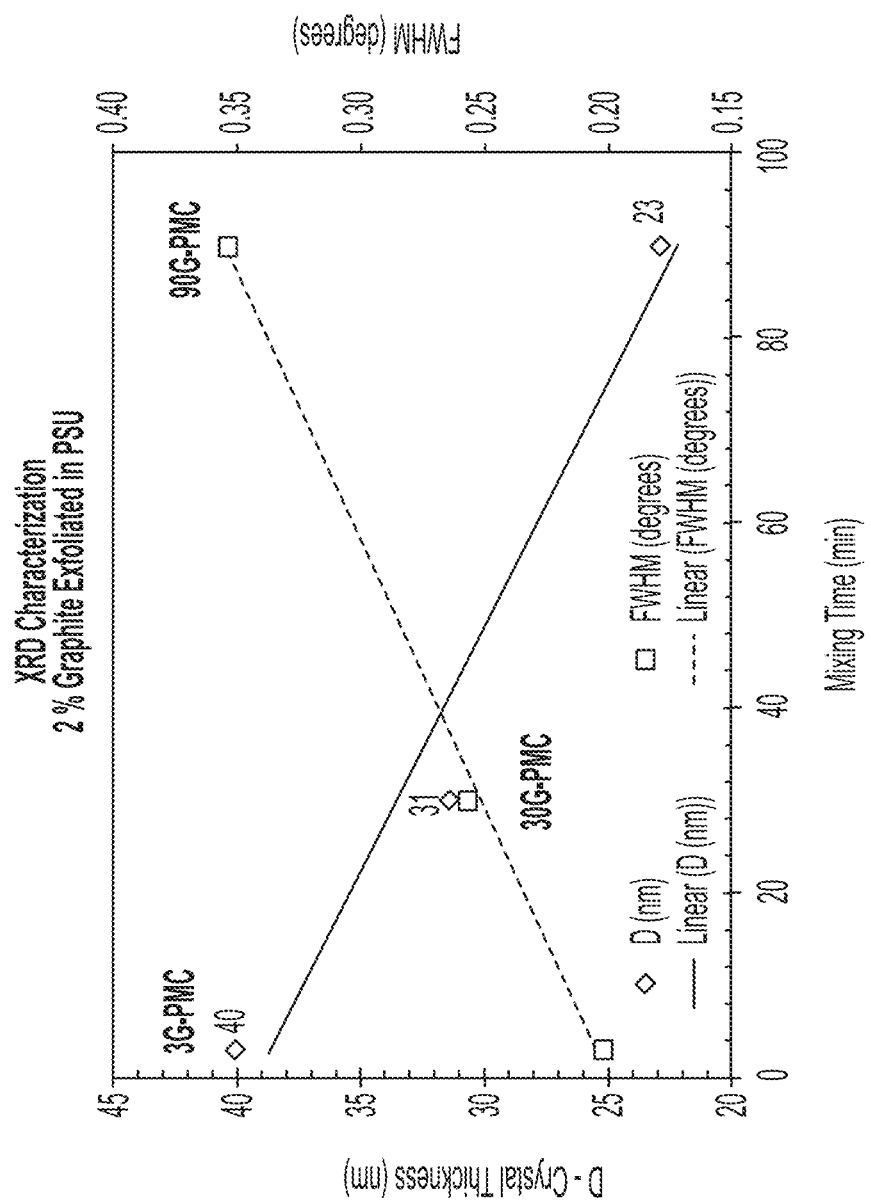
FIG. 5 illustrates a graph of the Debye-Scherrer Equation applied to the average XRD results from each 2% graphite exfoliated in polysulfone according to an in situ exfoliation method of the present disclosure.
Figure 6:
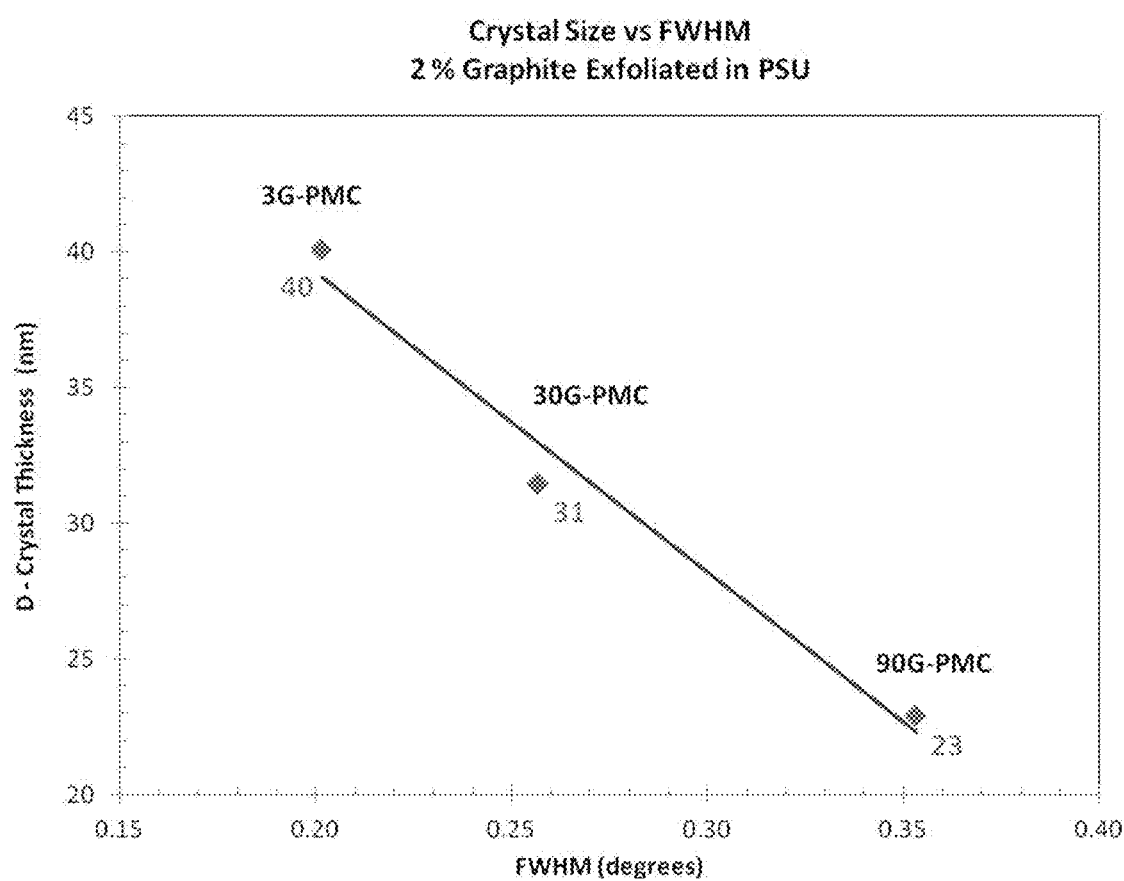
FIG. 6 illustrates a graph depicting the crystal size versus FWHM of 2% graphite exfoliated in polysulfone according to an in situ exfoliation method of the present disclosure.

The Debye-Scherrer equation was applied to the FWHM and d-spacing results obtained from the X-ray diffraction patterns for 3G-PMC, 30G-PMC, and 90G-PMC to provide the crystal thickness (D) of the multi-layer graphene or graphene nanoparticles. The XRD results and crystal thickness appear in Table 1. For the 3G-PMC, 30G-PMC, and 90G-PMC samples, the crystal thickness is 40 nm, 31 nm, and 23 nm; the FWHM is 0.202°, 0.257°, and 0.353°; and the d-spacing is 3.361 nm, 3.353 nm, and 3.387 nm, respectively. The FWHM increases with mixing time, and crystal thickness decreases with mixing time (FIG. 5), which indicates that mechanical exfoliation of the graphite to multi-layer graphene or graphene is occurring and is enhanced over longer mixing times. FIG. 6 shows the decrease in crystal size as a function of FWHM.

TABLE 1

Debye-Scherrer Equation applied to the average XRD results from each 2% Graphite Exfoliated in PSU sample mixed for 3 min, 30 min, and 90 min

| Sample | Mixing Time (min) | (d 002) (nm) | FWHM (degrees) | Average D - Crystal Thickness (nm) Along c-Axis Direction |
|---|---|---|---|---|
| 3G-PMC | 3 | 0.3361 | 0.202 | 40 |
| 30G-PMC | 30 | 0.3353 | 0.257 | 31 |
| 90G-PMC | 90 | 0.3387 | 0.353 | 23 |

Graphene Modification

Mechanical exfoliation of the graphite into multi-layer graphene or graphene as a result of the repetitive shear strain action in the polymer processing equipment generates dangling primary and secondary bonds that provide the opportunity for various chemical reactions to occur, which can be exploited to obtain property enhancement of the G-PMC. This represents an advance over prior art conventional methods forming graphene oxides, where the dangling primary and secondary bonds covalently bond with oxygen, which typically remain in these positions even after the graphene oxide is reduced.

For example, chemical reactions that covalently attach these dangling bonds from the multi-layer graphene or graphene nanoparticles to the polymer matrix would provide superior mechanical properties of the G-PMC. Alternatively, electrical conductivity may be enhanced by chemically linking appropriate band gap materials at the graphene nano-particle edges or by coordinating with conductive metals such as gold, silver, copper, and the like. The graphene-reinforced polymer may then be added to polymers or other compositions to provide or increase electrical conductivity. The bonds may also be coordinated to metals, such as platinum and palladium, to provide a catalyst, with the graphene-reinforced polymer serving as a catalyst support. Other forms of functionalized graphene are disclosed in U.S. Pat. No. 8,096,353, the disclosure of which is incorporated herein by reference.

The method of the present invention is particularly advantageous because in situ functionalization reactions may be performed during the exfoliation process via one pot reactive compounding.

The graphene-reinforced polymers may be used as electrodes for lightweight batteries. Other uses include composite boat hulls, aircraft, aerospace systems, transportation vehicles, personnel armor, pressure vessels, reactor chambers, spray coatings, polymer powders for 3-D printing, transparent electrodes for electronic device touch screens, and the like. Addition of 1-2 wt % graphene to a polymer matrix imparts electrical conductivity, while maintaining optical transparency, thus enabling applications in solar panels, flat-panel displays, and for static-discharge control in hospitals.

Mechanical exfoliation successfully converted 2% graphite melt-blended with PSU into a G-PMC using a repetitive shearing action in the Randcastle Extrusion System's Small Scale Extension Mixer. Results may be improved by machine modification to increase shear; for example, by using a larger diameter mixing element to increase rotational speed and/or by minimizing the spacing between the mixing element and the cylinder wall.

1. Modified Randcastle Extrusion System's Small Scale Extension Mixer:

The design of the existing small batch mixer may be modified to provide higher shear rate, which in turn provides superior mechanical exfoliation of graphite within the polymer matrix. The shear rate, $\dot{\gamma}$, is calculated according to Equation 3, where r is the tooling radius and Δr is the clearance for compounding. Machine modifications are listed in Table 2, along with the maximum achievable shear rate. The newly designed mixer has a maximum shear rate 22 times that of the current mixer, which will provide enhanced mechanical exfoliation of graphite within a polymer matrix at shorter lengths of time. In other words, the crystal size, D, may be reduced to smaller dimensions in a more efficient length of time.

$$\dot{\gamma} = \left(\frac{RPM}{60}\right)\left(\frac{2\pi r}{\Delta r}\right) \quad \text{Equation 3}$$

TABLE 2

Modifications of the Randcastle Extrusion System's Small Scale Extension Mixer to provide enhanced mechanical exfoliation

| | Current Randcastle Mixer | Improved Randcastle Mixer |
|---|---|---|
| Tooling Radius (inches) | 0.5 | 1 |
| Clearance for Compounding, Δr (in) | 0.04 | 0.01 |
| Maximum RPM | 100 | 360 |
| Maximum Shear Strain Rate (sec$^{-1}$) | 133 | 2900 |

2. Modified Single Screw Extrusion:

Randcastle has made modifications to the extruder screw that will better enable mechanical exfoliation of the graphite into multi-layer graphene or graphene in a polymer matrix to fabricate a G-PMC.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A method for forming a graphene-reinforced polymer matrix composite, comprising:
    (a) distributing graphite microparticles into a molten thermoplastic polymer phase, wherein at least 50% by weight of the graphite in the graphite microparticles consists of multilayer graphite crystals between 1.0 and 1000 microns thick along a c-axis direction; and
    (b) applying a succession of shear strain events to the molten polymer phase in situ so that the shear stress within said molten polymer phase is equal to or greater than the Interlayer Shear Strength (ISS) of said graphite microparticles and said molten polymer phase mechanically exfoliates the graphite successively with each event until said graphite is at least partially exfoliated to form a distribution in the molten polymer phase of essentially pure and uncontaminated single- and multi-layer graphene nanoparticles less than 10 nanometers thick along the c-axis direction.

2. The method of claim 1, wherein the graphite particles are prepared by crushing and grinding a graphite-containing mineral to millimeter-sized dimensions.

3. The method of claim 2, wherein the millimeter-sized particles are reduced to micron-sized dimensions using ball milling and attritor milling.

4. The method of claim 3, wherein the graphite particles are extracted from the micron-sized particle mixture by a flotation method.

5. The method of claim 4, wherein the extracted graphite particles are incorporated in a polymer matrix using a single screw extruder with axial fluted extensional mixing elements or spiral fluted extensional mixing elements.

6. The method of claim 5, wherein the graphite-containing polymer matrix is subjected to repeated extrusion to induce exfoliation of the graphitic material, thus forming a uniform dispersion of graphene nanoparticles in the polymer matrix.

7. The method of claim 6, wherein the polymer is selected from the group consisting of polyether-etherketones, polyetherketones, polyphenylene sulfides, poly-ethylene sulfides, polyetherimides, polyvinylidene fluorides, polysulfones, polycarbonates, poly-phenylene ethers/oxides, nylons, aromatic thermoplastic polyesters, aromatic polysulfones, thermoplastic polyimides, liquid crystal polymers, thermoplastic elastomers, polyethylenes, polypropylenes, polystyrene, polymethylmethacrylate, polyacrylonitrile, ultra-high-molecular-weight polyethylene, polytetrafluoroethylene, acrylonitrile butadiene styrene, polyamides, polyphenylene oxide, polyoxymethylene plastic, polyimides, polyaryletherketones, polyvinylchloride, acrylics, and mixtures of two or more thereof.

8. The method of claim 1, wherein the succession of shear strain events is applied until at least 50% by weight of the graphite is exfoliated to form a distribution in the molten polymer phase of single- and multi-layer graphene nanoparticles less than 10 nanometers thick along the c-axis direction.

9. The method of claim 1, wherein the succession of shear strain events is applied until at least 90% by weight of the graphite is exfoliated to form a distribution in the molten polymer phase of single- and multi-layer graphene nanoparticles less than 10 nanometers thick along the c-axis direction.

10. The method of claim 1, wherein the succession of shear strain events is applied until at least 75% by weight of the graphite is exfoliated to form a distribution in the molten polymer phase of single- and multi-layer graphene nanoparticles less than 10 nanometers thick along the c-axis direction.

11. The method of claim 1, wherein the graphite is doped with other elements to modify a surface chemistry of the exfoliated graphene nanoparticles.

12. The method of claim 1, wherein the graphite is expanded graphite.

13. The method of claim 1, wherein a surface chemistry or nanostructure of the dispersed graphite is modified to enhance bond strength with the polymer matrix to increase strength and stiffness of the graphene composite.

14. The method of claim 1, wherein the graphene nanoparticles are directionally aligned thereby providing one-, two- or three-dimensional reinforcement of the polymer matrix phase.

15. The method of claim 1, wherein said graphene-reinforced polymer matrix composite contains residual graphite microparticles.

16. A graphene-reinforced polymer matrix composite prepared by the method of claim 1, wherein the composite comprises contamination-free graphene-polymer interfaces and wherein the polymer adheres to or is covalently bonded to the graphene-polymer interfaces.

17. The graphene-reinforced polymer matrix composite of claim 16, wherein said composite contains between about 0.1% and about 30% by weight of graphene.

18. The graphene-reinforced polymer matrix composite of claim 16, wherein said composite contains between about 1% and about 10% by weight of graphene.

19. The graphene-reinforced polymer matrix composite of claim 16, wherein said composite contains between about 5% and about 50% by weight of graphene.

20. The graphene-reinforced polymer matrix composite of claim 16, wherein said composite contains between about 10% and about 30% by weight of graphene.

21. The graphene-reinforced polymer matrix composite of claim 16, wherein the polymer is selected from the group consisting of polyether-etherketones, polyetherketones, poly-phenylene sulfides, polyethylene sulfides, polyetherimides, polyvinylidene fluorides, polysulfones, polycarbonates, polyphenylene ethers/oxides, nylons, aromatic thermoplastic polyesters, aromatic polysulfones, thermoplastic polyimides, liquid crystal polymers, thermoplastic elastomers, poly-ethylenes, polypropylenes, polystyrene, polymethylmethacrylate, polyacrylonitrile, ultra-high-molecular-weight polyethylene, polytetrafluoroethylene, acrylonitrile butadiene styrene, poly-amides, polyphenylene oxide, polyoxymethylene plastic, polyimides, polyaryletherketones, polyvinylchloride, acrylics, and mixtures thereof.

22. The graphene-reinforced polymer matrix composite of claim 16 comprising residual graphite microparticles.

23. The graphene-reinforced polymer matrix composite of claim 16, wherein the graphite is expanded graphite.

24. The graphene-reinforced polymer matrix composite of claim 16, wherein a surface chemistry or nano structure of the dispersed graphite is modified to enhance bond strength with the polymer matrix to increase strength and stiffness of the graphene composite.

\* \* \* \* \*